C. F. BLANKE.
COFFEE POT.
APPLICATION FILED MAR. 31, 1909.
943,512.
Patented Dec. 14, 1909.
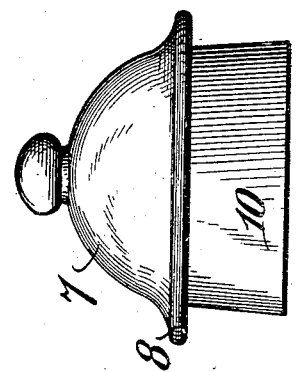
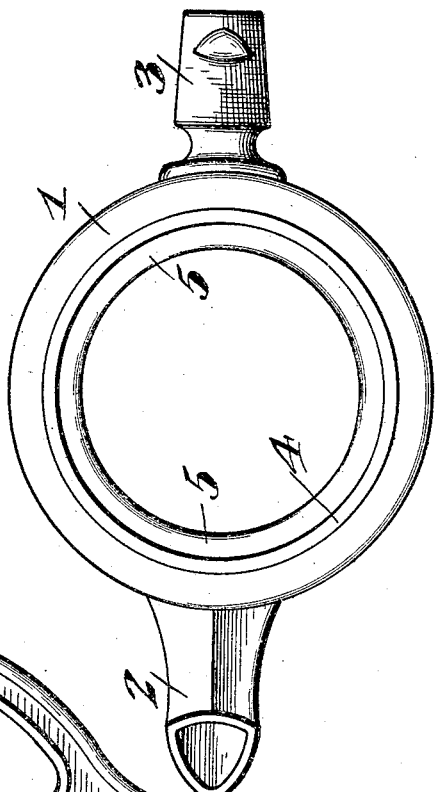
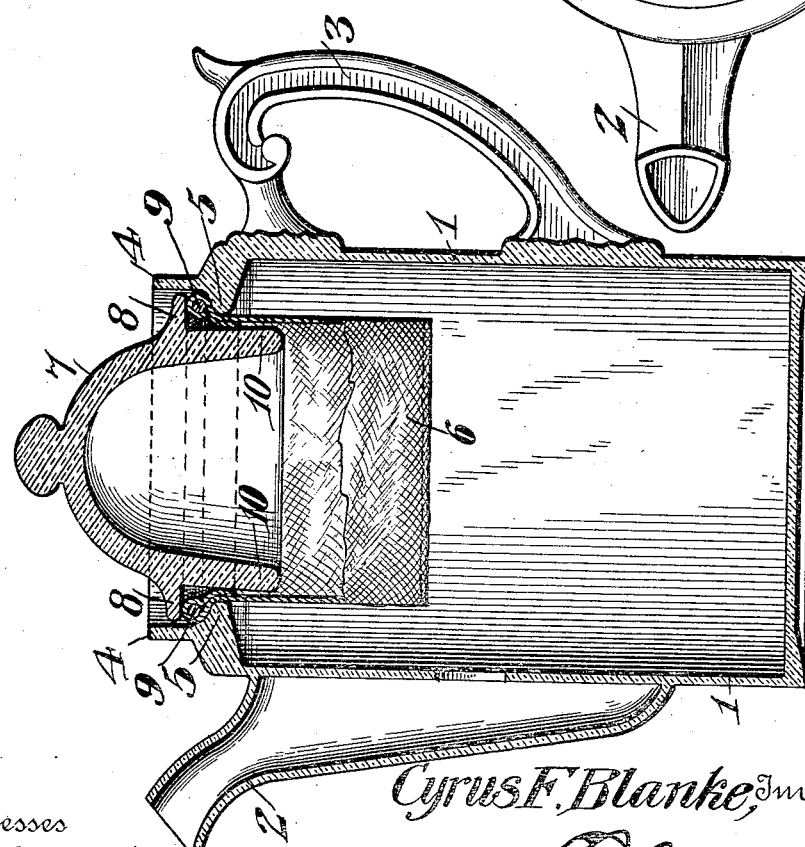

UNITED STATES PATENT OFFICE.

CYRUS F. BLANKE, OF ST. LOUIS, MISSOURI.

COFFEE-POT.

943,512.　　　　Specification of Letters Patent.　　Patented Dec. 14, 1909.

Application filed March 31, 1909.　Serial No. 486,941.

*To all whom it may concern:*

Be it known that I, CYRUS F. BLANKE, a citizen of the United States, residing at St. Louis, State of Missouri, have invented a new and useful Coffee-Pot, of which the following is a specification.

The invention relates to improvements in coffee pots.

The object of the present invention is to improve the construction of all china or earthenware coffee pots, tea pots, etc., and to provide a simple, strong and durable construction, adapted to positively retain the lid on a coffee pot, or other vessel, when the same is tilted for pouring out its contents.

A further object of the invention is to provide retaining means of this character adapted to dispense with the more or less fragile lugs usually employed for this purpose, and capable of coöperating with a percolator bag, whereby the lid or cover is more securely held on a coffee pot and the parts prevented from being chipped, cracked, or otherwise injured when the lid is placed on or removed from the coffee pot.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a vertical sectional view of a coffee pot, constructed in accordance with this invention. Fig. 2 is a plan view of the coffee pot, the lid and the percolator bag being removed. Fig. 3 is a side elevation of the lid.

Like numerals of reference designate corresponding parts in all the figures of the drawing.

1 designates the body of a coffee pot, designed to be constructed of china or other earthenware to prevent it from being effected by the acid in coffee, and provided at the front with a spout 2 and having a handle 3 at the back. The coffee pot is provided at the top with an upwardly projecting flange 4 from the base of which extends an interiorly arranged circular ledge 5. The ledge 5, which is smooth, continuous and unbroken, forms a support for a percolator bag 6 and a lid 7. The lid 7 is preferably hollow, as shown, and is provided with an outwardly projecting peripheral portion 8, fitting in the space within the flange 4, and adapted to hold the percolator bag against the ledge 5. The percolator bag, which is constructed of fabric, is provided with a split expansible aluminum ring 9, similar to that illustrated and described in Patent No. 909,528, granted to me, Jan. 12, 1909. The ring expands the mouth of the bag and prevents the latter from dropping from the supporting ledge to the bottom of the body of the coffee pot.

In order to retain the lid on the coffee pot, when the latter is tilted for pouring out its contents, the said lid is equipped with a depending annular flange 10, inclined downwardly and outwardly from the inner edge of the projecting peripheral portion 8, and gradually increasing in diameter to its lower edge, where it is of a size slightly less than the interior diameter of the coffee pot at the ledge 5. The fabric percolator bag partially constricts the space between the ledge and the depending lid-retaining flange or member 10, so that pressure is required to force the lower end of the flange into the coffee pot, when the percolator is in place on the ledge. This results in the percolator bag frictionally engaging and retaining the flange or member 10 within the body of the coffee pot, whereby the lid of the coffee pot is effectually prevented from falling off when the coffee pot is tilted or partially inverted for pouring out its contents. The fabric percolator bag besides coöperating with the lid-retaining member to hold the lid on the coffee pot also prevents the china, or other material of the lid from coming in contact with the ledge of the coffee pot, so that there is no liability of the parts being injured in placing the lid on and removing it from the coffee pot. The depending annular portion is of the same thickness as the body portion of the lid, as clearly illustrated in Fig. 1 of the drawing, and it forms a continuation of the said body portion, the peripheral supporting or engaging portion 8 of the lid being in the nature of a projecting annular flange.

While the depending upwardly tapered lid-retaining member is designed particularly for use on coffee pots, and coöperates with the percolator or strainer bag, it may be advantageously employed on the lids of other analogous vessels.

Having thus fully described my invention, what I claim as new and desire to secure by Letters Patent, is:—

1. The combination with a coffee pot having an inwardly extending ledge arranged at a point below the upper edge thereof so as to leave a surrounding flange, of a lid adapted to rest upon the ledge within the said flange and provided with a depending annular flange increasing in diameter toward its lower edge, the greatest diameter of the flange being slightly less than the interior diameter of the coffee pot at the said ledge, and a fabric percolator bag supported on and by the said ledge and depending within the pot around the flange of the lid, thereby cushioning the space between the ledge and the said lid and providing a cushioned frictional engagement between the ledge and the flange so as to retain the lid on the coffee pot.

2. The combination with a coffee pot having an inwardly extending annular ledge arranged at a point below the upper edge thereof so as to leave a surrounding flange, of a lid provided with a projecting peripheral portion adapted to be supported by the said ledge and confined within the said flange, said lid being also provided at the inner edge of the projecting peripheral portion with a depending exteriorly tapered annular flange increasing in diameter from the top to the bottom and extending into the coffee pot a considerable distance below the ledge, the exterior diameter of the lower edge of the depending flange being slightly less than the interior diameter of the said coffee pot at the said ledge so as to engage beneath the latter to retain the lid on the coffee pot when the same is inverted, said depending flange being of uniform diameter at its lower end so that the lid may be arranged in any position with relation to the ledge.

3. The combination with a coffee pot having an inwardly extending annular ledge arranged at a point below the upper edge thereof so as to leave a surrounding flange, of a lid provided with a projecting peripheral portion adapted to be supported by the said ledge and confined within the said flange, said lid being also provided at the inner edge of the projecting peripheral portion with a depending exteriorly tapered annular flange increasing in diameter from the top to the bottom and extending into the coffee pot a considerable distance below the ledge, the exterior diameter of the lower end of the depending flange being slightly less than the interior diameter of the coffee pot at the ledge so as to barely enter the coffee pot, whereby when a fabric percolator bag is suspended from the ledge it will constrict the space between the ledge and the depending flange and provide a cushioned frictional engagement to retain the lid positively on the coffee pot.

In testimony, that I claim the foregoing as my own, I have hereto affixed my signature in the presence of two witnesses.

CYRUS F. BLANKE.

Witnesses:
GEO. C. HAFFERKAUER,
HERTHA KRALEMANN.